May 29, 1956 C. L. HOGAN 2,748,353
NON RECIPROCAL WAVE GUIDE ATTENUATOR
Original Filed May 26, 1951 3 Sheets-Sheet 1

INVENTOR
C. L. HOGAN
BY Franklin Mohr
ATTORNEY

May 29, 1956            C. L. HOGAN            2,748,353
NON RECIPROCAL WAVE GUIDE ATTENUATOR
Original Filed May 26, 1951            3 Sheets-Sheet 2
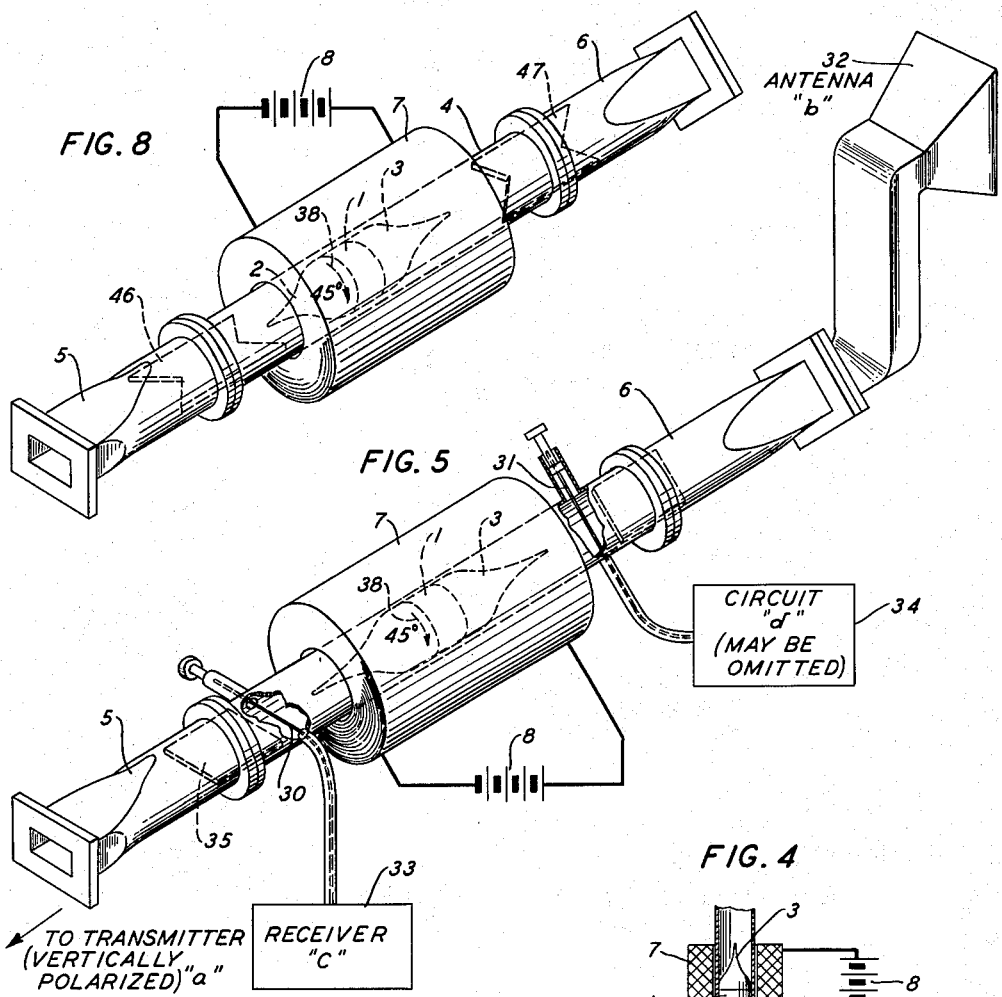
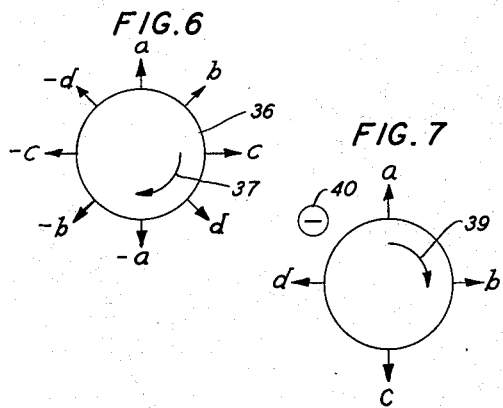
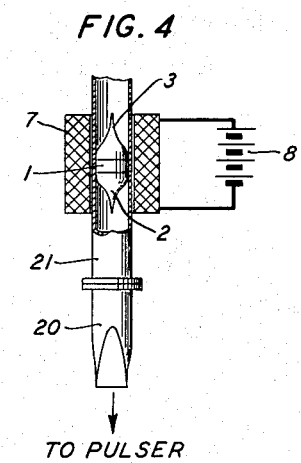
INVENTOR
C. L. HOGAN
BY Franklin Mohr
ATTORNEY May 29, 1956 C. L. HOGAN 2,748,353
NON RECIPROCAL WAVE GUIDE ATTENUATOR
Original Filed May 26, 1951 3 Sheets-Sheet 3
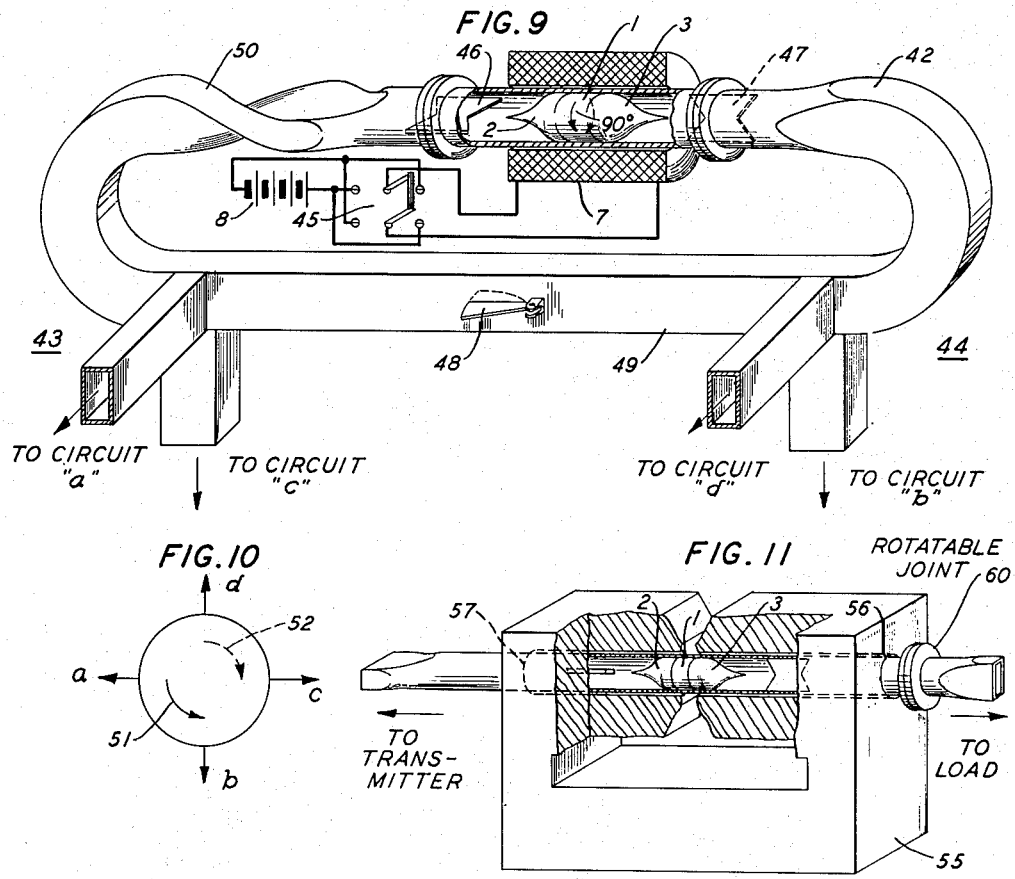
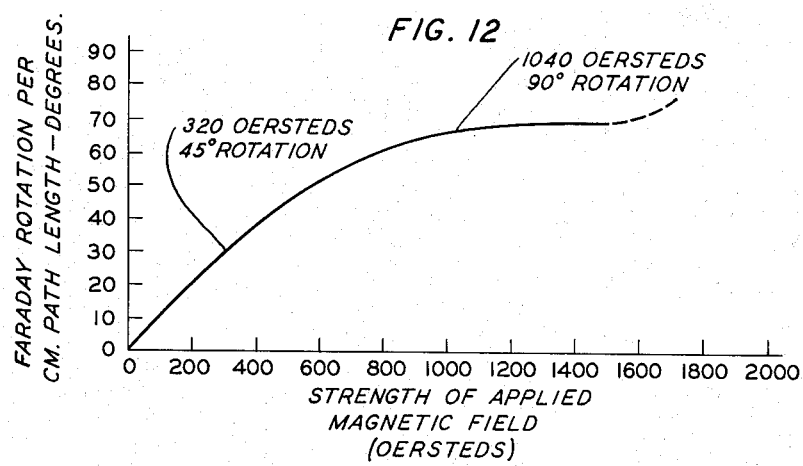
INVENTOR
C. L. HOGAN
BY
Franklin Mohr
ATTORNEY United States Patent Office 2,748,353
Patented May 29, 1956

2,748,353

NON-RECIPROCAL WAVE GUIDE ATTENUATOR

Clarence L. Hogan, Madison, N. J., assignor to Bell Telephone Laboratories, Incorporated, New York, N. Y., a corporation of New York Original application May 26, 1951, Serial No. 228,379. Divided and this application October 22, 1951, Serial No. 252,432

1 Claim. (Cl. 333—81)

This application is a division of my prior application Serial No. 228,379, filed May 26, 1951.

This invention relates to new and useful devices employing Faraday-effect rotation of the plane of polarization of plane polarized electromagnetic waves.

An object of the invention is to extend practical usefulness of the Faraday effect into the range of wavelengths longer than those of the visible spectrum and particularly into the microwave range, without producing material attenuation of the waves in the process.

In accordance with the invention, in certain specific embodiments thereof, a block of magnetic material, for example nickel-zinc ferrite which may be in the form of a cylinder a centimeter in diameter and a centimeter thick, more or less, is used in the microwave range as an antireciprocal (Faraday-effect) rotator of the plane of polarization of plane polarized electromagnetic waves and as such may be employed in switching devices, attenuators, modulators, circular polarizers, et cetera, and in the class of devices not governed by a reciprocity law, for example, one-way transmission systems, and directionally selective phase shifters including certain devices which have been called "gyrators."

The Faraday effect in the optical range has long been known. Attempts heretofore to extend the use of the effect to wavelengths longer than those of the visible spectrum, and in particular to the microwave range have been of no practical consequence because of the general weakness of the Faraday effect in substances that are transparent to visible light or because of excessive attenuation of waves of longer wavelength such as microwaves in suitable thicknesses of certain ferromagnetic substances such as iron where the amount of Faraday-effect rotation per unit thickness for very thin sheets that could be penetrated by light was known to be large. Published researches on the theory of ferromagnetic resonance have provided a theoretical basis from which I have been able to predict the presence of a pronounced Faraday effect in substances which exhibit this kind of resonance, for example, ferromagnetic metallic oxides. I have discovered that magnetic materials such as the ferromagnetic metallic oxides and notably nickel-zinc ferrite, in a thickness of the order of magnitude of a wavelength, are capable of producing angular rotations of the plane of polarization of plane polarized waves to the extent of 45° or 90° or more in the presence of magnetizing fields which are readily produced in practice and that these materials in such thicknesses are capable of transmitting electromagnetic waves, for example in the centimeter range, with substantially negligible attenuation. I have discovered further that the angle of rotation of polarized electromagnetic waves in magnetic materials exhibiting ferromagnetic resonance is approximately directly proportional to the thickness of the material traversed by the waves and to the intensity of magnetization to which the material is subjected, whereby it is possible to adjust the amount of rotation by varying or properly choosing the thickness of the material traversed and the intensity of magnetization.

In the drawings:

Figs. 3, 4 and 5 are views, partly in perspective and partly diagrammatical showing other embodiments of the invention, Fig. 3 showing an anti-fading system, Fig. 4 a system for producing circularly polarized waves, and Fig. 5, a non-reciprocal four channel switching arrangement;

Figs. 6 and 7 are diagrams useful in explaning the operation of the equipment of Fig. 5;

Fig. 8 is a view partly in perspective and partly diagrammatical showing an embodiment of the invention in a one-way transmission system;

Fig. 9 is a view, partly in perspective and partly diagrammatical, showing a combination of wave-guide junctions with a 90° phase rotator to form a non-reciprocal four channel switching arrangement whose properties are similar to the system shown in Fig. 5;

Fig. 10 is a diagram useful in explaining the operation of the system of Fig. 9;

Fig. 11 is a perspective view of a wave guide system embodying the invention, mounted in a cylindrical opening in a permanent magnet or other magnetic core structure; and Fig. 12 is a plot of the relationship between strength of applied magnetic field and Faraday-effect rotation in a certain element embodying the invention.

Figure 1:
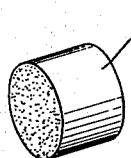
Fig. 1 is a perspective view of a piece of magnetic material useful singly or in combination as an embodiment of the invention.

Referring to Fig. 1, there is shown a block 1 of magnetic material, for example a piece of ferromagnetic metallic oxide, capable of transmitting electromagnetic waves and having a thickness of the order of magnitude of a wavelength, for example one centimeter, more or less, which has been found to operate satisfactorily as a directionally selective phase rotator for polarized electromagnetic waves. An element of this type which has been successfully used was made by powdering sintered nickel-zinc ferrite until the largest particles passed a 40-mesh screen, mixing this powder with small spheres of polystyrene which were fine enough also to pass a 40-mesh screen, in the proportion of 75% of volume of ferrite and 25% volume of polystyrene, then slightly wetting the mixture with a dilute solution of polystyrene in benzene to render the mixture tacky and pressing the material into a cylindrical form in a die under 5 tons pressure. By measuring the density before and after powdering it was estimated that the final compacted cylinder was approximately 60% nickel-zinc ferrite by volume. Before powdering, the nickel-zinc ferrite had been determined to have a saturation magnetization of approximately 2250 gauss and a resistivity of about ten million ohm-centimeters and hence the cylinder as formed would be expected to have a saturation magnetization of approximately 1350 gauss. The local conductivity, which is important at these frequencies, is probably unchanged by the powdering, but since the loss of polystyrene is negligible, the loss per centimeter thickness in the powdered cylinder should be only six-tenths of that in the original sintered nickel-zinc ferrite. Since mathematical analysis shows that the rotation per centimeter is approximately proportional to the saturation magnetization, no apparent advantage in degree of rotation is obtained by powdering. However, the tapered transition members (2 and 3 in Fig. 2) that were used to cut down reflections from the faces of the ferrite cylinder were made of polystyrene and it was advantageous to have the dielectric constant of the composite ferrite cylinder match that of the transition members as closely as possible. This match is considerably improved by the powdering and dilution technique discussed above.

In order to effect Faraday rotation, waves must be transmitted through a transparent isotropic medium parallel to the direction of the lines of force of the magnetic field. The effect may be conveniently produced by placing the medium along the axis of a solenoid. The rotation is designated as positive if it is in the direction of the positive electric current which produces the magnetic field and negative if in the opposite direction. It is believed that all transparent substances show the Faraday rotation. It was at one time thought that diamagnetic substances showed a positive rotation and ferromagnetic substances showed a negative rotation but this is now known to be incorrect. While not explicity stated, a theory of the ferromagnetic Faraday effect can be derived from an article by D. Polder in Philosophical Magazine, volume 40, pages 99–115 (1949), in connection with an analysis of the gyromagnetic resonance in ferromagnetics involving precession of spinning electrons about the direction of an impressed magnetic field.

In the above-mentioned reference, Polder has shown that an electromagnetic wave being propagated in a ferromagnetic medium which is homogeneously magnetized in a direction parallel to the direction of propagation will split into positive and negative circularly polarized components which travel with different velocities in the medium.

In deriving his expressions, however, Polder assumed no damping of the electrons as they precess about the field direction. This assumption is probably valid at frequencies which are far removed from the resonance absorption frequency. In addition, however, Polder has tacitly assumed no dielectric loss as the wave is propagated through the ferromagnetic medium. Since appreciable dielectric loss occurs when microwaves are propagated through ferrites it is necessary to extend Polder's theory to include this case. In addition, Polder's theory is extended below to explain the ferromagnetic Faraday effect in the vicinity of the gyromagnetic resonance.

If an effective magnetic field, $H_0$, is applied in the Z direction, to a ferromagnetic medium, and if then a high frequency field is applied in an arbitrary direction, the relation between the periodic parts of B and H, (namely $b$ and $h$) is given by the following equations:

$$b_x = \mu h_x - j\mu' h_y \quad (1)$$
$$b_y = j\mu' h_x + \mu h_y \quad (2)$$
$$b_z = h_z \quad (3)$$

where:

$$\mu = \frac{\gamma^2 H_0 B_0 - \omega^2}{\gamma^2 H_0^2 - \omega^2}$$

$$\mu' = \frac{4\pi M_0 \gamma \omega}{\gamma^2 H_0^2 - \omega^2}$$

$\gamma$=gyromagnetic ratio for electrons $17.6 \times 10^6$ radians per second per oersted
$\omega$=angular frequency of the incident wave in radians per second
$M_0$=magnetization of medium.

If a plane electromagnetic wave is propagated through this medium in the Z direction it is necessary, in order to describe this wave, to find a set of solutions to Maxwell's equations which are consistent with the above set of Equations 1, 2, 3, and in which $b$, $h$, E, and D are all proportional to $\exp(j\omega t - \Gamma Z)$.

It can be shown that the only possible solution under these conditions consists of either a positive or a negative circularly polarized wave for which the propagation constants are:

$$\Gamma_+ = \frac{j\omega}{c}\sqrt{\epsilon(\mu+\mu')} = \alpha_+ + j\beta_+ \quad (4)$$

and $$\Gamma_- = \frac{j\omega}{c}\sqrt{\epsilon(\mu-\mu')} = \alpha_- + j\beta_- \quad (5)$$

If Equations 4 and 5 are solved for the phase constants $\beta_+$ and $\beta_-$ the following result is obtained:

$$\beta_\pm = \frac{\omega}{c}\sqrt{\frac{\epsilon'+|\epsilon|}{2}}\sqrt{\mu \pm \mu'} \quad (6)$$

where $\epsilon = \epsilon' - j\epsilon''$ = a complex dielectric constant and $$|\epsilon|^2 = (\epsilon')^2 + (\epsilon'')^2$$

From this relation, one can obtain a real index of refraction for each component, given by $$n_\pm = \frac{c}{\omega}\beta_\pm = \sqrt{\frac{\epsilon'+|\epsilon|}{2}}\sqrt{1+\frac{4\pi M_0 \gamma}{\omega_0 \mp \omega}} \quad (7)$$

where:

$$\omega_0 = \gamma H_0$$

Since the electromagnetic wave under discussion splits into two circularly polarized components which travel with different velocities in the ferromagnetic medium, the components will, upon emerging from the medium, unite to form a plane polarized wave in which the plane of polarization has been rotated through an angle $\theta$ while traveling through the medium, where $$\theta = \frac{l}{2}[\beta_- - \beta_+] \quad (8)$$

in which $l$=path length through the ferromagnetic medium

By means of Equation 6 above, this can be written as $$\frac{\theta}{l} = \frac{\omega}{2c}\sqrt{\frac{\epsilon'+|\epsilon|}{2}}\left[\sqrt{1+\frac{4\pi M_0 \gamma}{\omega_0+\omega}} - \sqrt{1+\frac{4\pi M_0 \gamma}{\omega_0-\omega}}\right] \quad (9)$$

If the effective magnetic field within the ferromagnetic medium is small enough so that $$\omega_0 \ll \omega \quad (10)$$

Equation 9 can be written as $$\frac{\theta}{l} = \frac{\omega}{2c}\sqrt{\frac{\epsilon'+|\epsilon|}{2}}\left[\sqrt{1+\frac{4\pi M_0 \gamma}{\omega}} - \sqrt{1-\frac{4\pi M_0 \gamma}{\omega}}\right] \quad (11)$$

This can be further simplified when $$\frac{4\pi M_0 \gamma}{\omega} \ll 1 \quad (12)$$

to $$\frac{\theta}{l} = \frac{1}{2c}\sqrt{\frac{\epsilon'+|\epsilon|}{2}}(4\pi M_0 \gamma) \quad (13)$$

If we assume as reasonable representative values:

$$4\pi M_0 = 1000 \text{ gauss}$$
$$\epsilon' = 16$$
$$\epsilon'' = 0$$

Equation 13 gives a rotation of $$\frac{\theta}{l} = 1.2 \text{ radians per centimeter}$$

$$\doteq 69 \text{ degrees per centimeter} \quad (18)$$

An important result of the foregoing analysis is that this relatively large rotation appears at frequencies greatly different from the resonance absorption frequency; and, if the conditions 10 and 12 obtain, the rotation as expressed in Equation 13 is seen to be independent of the frequency of the incident wave, and hence any device making use of this rotation would be broadband in its transmission characteristics. In addition, the rotation is proportional to the magnetization of the sample. Below magnetic saturation, the magnetization is, of course, dependent upon the applied magnetic field, and hence, below saturation, the rotation is substantially proportional to the applied magnetic field.

If magnetic losses are included in the analysis, the theory also predicts that in the region where the frequency of the incident wave is close to the ferromagnetic resonance absorption frequency, the positive circularly polarized component is substantially completely absorbed while the negative component is propagated with attenuation only slightly different from that due to the usual dielectric losses. Hence, near the resonance absorption frequency the wave after transmission through the ferromagnetic medium is circularly polarized.

It has been experimentally confirmed that this theory does predict quantitatively the behavior of most ferrites up to saturation. In addition, I have obtained substantially circularly polarized waves by transmitting a plane polarized wave through a block of ferrite when the frequency of the wave was close to the resonance frequency. The accompanying transmission loss measured only slightly greater than 3 decibels, indicating that the negative component was being propagated with only slight attenuation while the positive component was being almost completely absorbed.

It should be noted that the Faraday rotation depends for its direction upon the direction of the magnetic field, in the same manner as the direction of translation of a screw is related to its direction of rotation. Thus, if the direction of the magnetic field is reversed, the direction of the Faraday rotation is also reversed in space while retaining its orignal relationship to the direction of the field. The rotation is independent of the sense of propagation along the axis of the ferromagnetic element. A wave passing through the element first in one direction and then in the other undergoes two successive phase rotations in the same sense, thereby doubling the rotation undergone in a single passage. This differs from the case of a phase rotation obtainable in a twisted rectangular wave guide, for example, where a wave passing through in one direction has its plane of polarization rotated through a certain angle but upon passing through in the reverse direction has its plane of polarization rotated back through the same angle to its original orientation. The same distinction holds for rotations undergone by a wave passing through certain crystalline structures, wherein a plane polarized wave after passing back and forth through the same structure an even number of times undergoes no net rotation of its plane of polarization.

In a simplified view of the phenomenon involved, a plane polarized wave incident upon the magnetic material in the presence of the magnetic field produces two sets of secondary waves in the material, each set of secondary waves being circularly polarized. The two sets of secondary waves are circularly polarized in opposite senses and they travel through the medium at unequal speeds. Upon emergence from the material, the secondary waves in combination set up a plane polarized wave, which is in general polarized at a different angle from the original wave.

Figure 2:
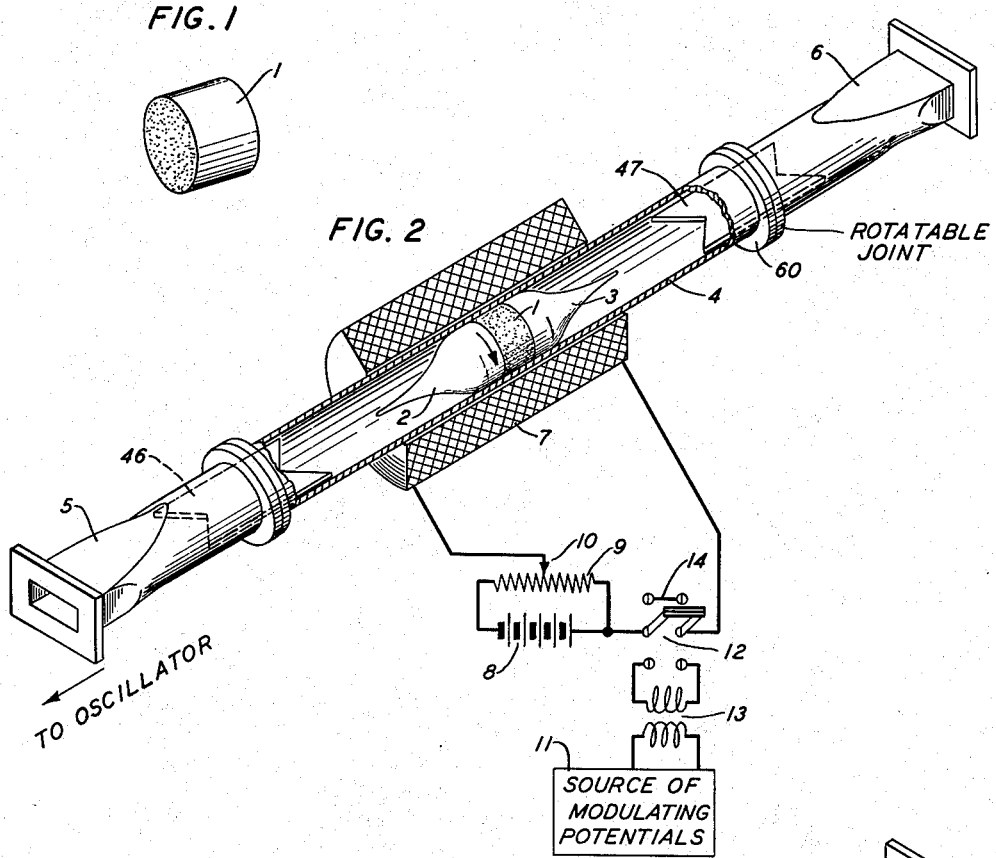
Fig. 2 is a view, partly in perspective and partly diagrammatical, showing a system utilizing a piece of material such as shown in Fig. 1 in a wave-guide system for microwaves.

Fig. 2 shows the element of Fig. 1 arranged to be used as either a variable attenuator or as a modulator. The element 1 with accompanying conical transition members 2 and 3 which may be of polystyrene, is shown mounted inside a length of circular wave guide 4 which is in turn mounted between two aligned and similarly oriented circular to rectangular transition wave guide members 5 and 6. By similar orientation is meant that the long dimension of the rectangular guide in section 5 is parallel to that in section 6 and similarly the short dimension of the section 5 is parallel to the short dimension of the section 6. The wave guide members 4, 5 and 6 may be joined together by means of flanges, one or more of which may be rotatable, or in other suitable manner known to the prior art. A solenoid 7 is mounted upon the outside of the wave guide section 4 and is supplied with a source of energizing current represented for purposes of illustration as a battery shunted by a potentiometer 9 having a variable contact arm 10. A source of modulating potentials 11 is arranged to be connected in series with the solenoid 7, when desired, by means of a double-pole double-throw switch 12. With the switch 12 in the lower of the positions shown in Fig. 2 the source 11 is connected to the solenoid 7 through a suitable transformer 13. When the switch 12 is in the upper position the source 11 is disconnected and the circuit of the solenoid is completed through a strap 14. In an embodiment that has been successfully operated, the solenoid 7 had a length of about one foot and the element 1 was placed in the uniform field region in the center of the coil.

In the operation of the system of Fig. 2 as a variable attenuator, the switch 12 is thrown to the upper position. The rectangular portions of the wave guide sections 5 and 6 serve as polarizers for plane waves in that they will accept only that component of the electric vector which is consistent with the $TE_{10}$ mode in the rectangular guide, and by means of a smooth transition from rectangular to circular cross section, this mode goes over into the $TE_{11}$ mode in the circular portion of the guide. The dimensions of the wave guides are preferably chosen so that only the dominant mode in each can be propagated. The solenoid 7 when energized provides an axial magnetic field in the direction of the thickness of the device 1. The wave guide sections 5 and 6 being aligned and similarly oriented will accept only the component of the electric vector in one preferred direction. With the arm 10 set at the extreme right-hand end of the potentiometer 9 there is substantially no magnetizing potential applied to the solenoid 7 and, assuming that there is no residual magnetization, no rotation of the plane of polarization occurs in element 1. A wave of suitable frequency received from an oscillator and impressed upon the section 5 passes through the element 1 and into the section 6 without any change in the plane of polarization and with only a small amount of attenuation which is inherent in the operation of the element 1 which in an embodiment that has been successfully operated was found to be of the order of magnitude of 0.8 decibel at a wavelength of approximately 3 centimeters. Alignment of the sections 5 and 6 may be adjusted by means of the rotatable joint 60. Attenuation may be introduced into the system between the sections 5 and 6 by moving the potentiometer arm 10 to the left thereby supplying an adjustable amount of magnetizing current to the solenoid 7, and the potentiometer 9 may be calibrated in known manner to indicate in decibels or other suitable units the amount of attenuation inserted at any setting of the arm 10. The added attenuation comes about on account of the rotation of the plane of polarization of the waves which is accomplished due to the Faraday effect in the element 1 thereby turning the plane of polarization of the waves away from the preferred direction in the section 6 so that only a component of the full intensity of the wave is effective to produce an output in the section 6. The component that is rejected is absorbed by the resistive vanes 46 and 47 which are preferably notched in order to afford a smooth transition and insure maximum absorption. When the element 1 introduces a 45° rotation, the intensity of the output of the section 6 has approximately one-half the value which it would have in the preferred polarization and approximately 3 decibels of attenuation are added thereby. When a 90° phase rotation is introduced the wave is polarized at right angles to the preferred direction in the section 6 and substantially no output is produced. The maximum attenuation that might be introduced is theoretically infinite and in the practical case may be made very large by the use of a moderately strong magnetic field such as approximately 250 gauss. The transition members 2 and 3 serve to reduce reflections of waves that would arise due to the discontinuity introduced by the surfaces of the element 1. The output of the section 6 may be fed to an antenna or any other suitable utilization device.

Turning now to the operation of the system of Fig. 2 as a modulator, the switch 12 is to be thrown to the lower position and the potentiometer arm 10 may be set permanently at an intermediate position on the potentiometer. In such a position and in the absence of modulating potentials an intermediate amount of phase rotation is introduced by the solenoid 7 to the device 1, a suitable amount being, for example, 45°. The normal output of the section 6 is in this case reduced accordingly to approximately one-half. Application of modulating potentials from the source 11 serves to vary the magnetizing current in the solenoid and thereby alternately to increase and decrease the amount of phase rotation produced and consequently the output of the section 6, in accordance with the variation of the modulating potentials. In this way a modulated wave is produced and may be supplied to the antenna or other utilization device in known manner.

In an alternative adjustment and manner of operation of the device of Fig. 2 as a modulator the section 6 is oriented in space at an angle with respect to section 5 by means of the rotatable joint 60 and the potentiometer arm 10 may be set at the extreme right-hand end of the potentiometer 9. The physical angle of the section 6 with respect to section 5 may be selected as 45°, for example, in which case the output in the absence of magnetizing current is one-half the maximum obtainable by optimum polarization. Application of modulating potentials through the transformer 13 then introduces an alternating magnetizing current in the solenoid 7 which rotates the plane of polarization of the waves alternately, clockwise and counter-clockwise, and thereby alternately decreases and increases the power output of section 6 in accordance with the variations in the modulating potentials.

Figure 3:
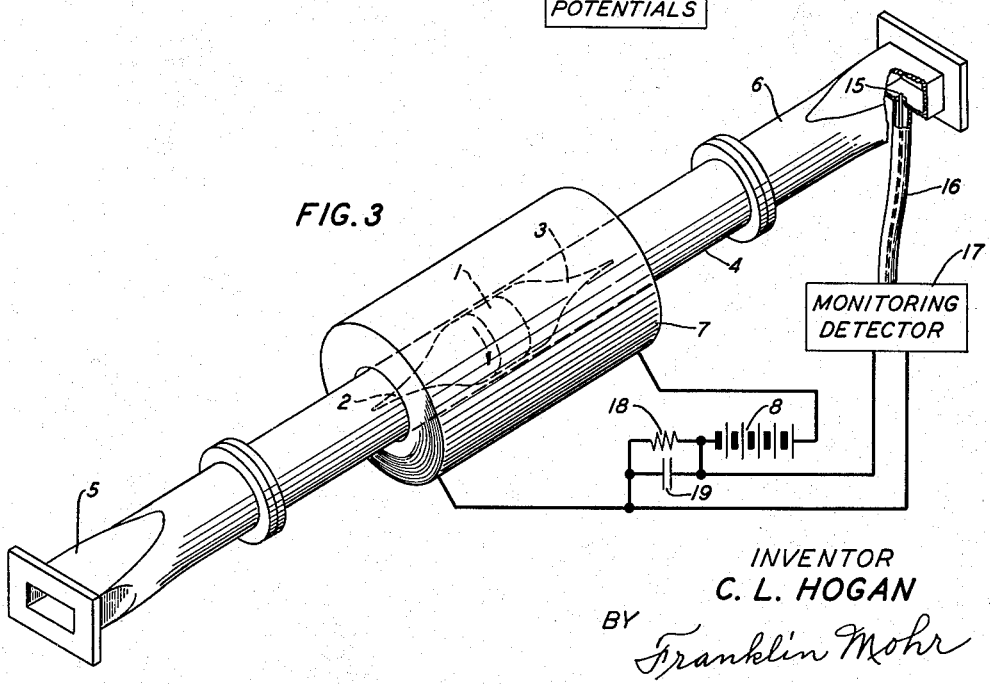

Fig. 3 shows the use of the element 1 in an automatic volume control system or anti-fading device. The arrangement of parts is the same as in Fig. 2 except that the potentiometer 9 and switch 12 may be dispensed with, the magnetization being supplied by current from the fixed source, battery 8. A probe 15, which preferably projects only slightly into the wave guide so as to disturb transmission therein only slightly, is added in the section 6 for the purpose of picking up a monitoring potential from the wave therein. The probe 15 may be connected as through a coaxial transmission line 16 to a monitoring detector 17 the output of which latter is connected to a resistor 18 which is serially connected in the energizing circuit of the solenoid 7. The resistor 18 is preferably shunted by a condenser 19 in the usual manner of a volume control system. The wave guide sections 5 and 6 are preferably, but not necessarily, similarly oriented.

In the operation of the arrangement of Fig. 3 the potential of the source 8 may be selected to produce an intermediate amount of phase rotation so that normally the output in the section 6 is less than the maximum output and may advantageously be made one-half the maximum. A variable increment is added to the potential applied by the source 8 due to the presence of a control current supplied by the monitoring detector 17 and passing through the resistor 18. Should fading occur in the wave supplied to the system through the section 5 so that the power output in the section 6 is decreased, the amount of energy picked up by the probe 15 is also decreased and the current passed back to the resistor 18 is reduced. The connections are made in such a way that the potential developed across the resistor 18 opposes that developed by the source 8 so that when the monitoring current is decreased the amount of phase rotation in the device 1 is also decreased thereby shifting the plane of polarization more nearly into line with the direction of the probe 15 and thereby increasing the power output of the section 6 to offset the tendency of the same to decrease due to the fading. Should the power input of section 5 increase, the effect of the described feedback system is to increase the phase rotation in the element 1 thereby turning the plane of polarization further away from the direction of the probe 15 and decreasing the output of section 6. It is evident that the system may be adjusted in well known manner to maintain a substantialy constant output in section 6 during variation of the power in input section 5 over a wide range. The condenser 19 functions to smooth out the more rapid variations in the reaction of the feedback circuit thereby avoiding unnecessary temporary readjustments of the attenuation during transient disturbances.

Fig. 4 shows an arrangement in which the element of Fig. 1 is employed to transform a plane polarized wave into a circularly polarized wave.

Theoretical considerations hereinbefore set forth indicate that the Faraday rotation effect is dependent upon the existence of resonant frequencies in the magnetic material. Upon entering the magnetic material the impressed wave sets up two secondary waves each of which is circularly polarized and the direction of rotation of the plane of polarization is opposite in the two components. When the frequency of the impressed wave is remote from a resonance absorption frequency the two secondary wave components are constrained to travel through the magnetic material with unequal velocity. The relative difference in the velocities increases as the frequency of the impressed wave approaches the resonance frequency. In addition, if the impressed frequency is close to a resonance frequency, absorption takes place in the sense that energy from the resonant or nearly resonant wave component is transferred into heat or some other form of energy inside the material and if the resonance is substantially complete, one of the wave components may be thus completely absorbed, leaving the other component to traverse the magnetic material and emerge at the output of the system as a circularly polarized wave. Instead of changing the frequency of the impressed wave to increase absorption, it is possible to move the resonance frequency of the magnetic material by varying the magnetic field. In the microwave case, the magnetic resonance frequency is normally much lower than the frequency of the impressed wave but the resonance frequency may be brought up into the centimeter wave range by impressing rather large magnetizing fields. The elimination of one of the circularly polarized components results, of course, in a loss of approximately 3 decibels, although this is not excessive in view of certain advantages of securing a circularly polarized wave.

In Fig. 4 there is shown a rectangular wave guide 20 which merges into a circular section 21 containing the element 1 and surrounded by the solenoid 7 which is connected to the battery 8.

In the operation of the system of Fig. 4 the potential of the source 8 is to made sufficiently great to bring the magnetic resonance frequency of the element 1 into approximate agreement with the frequency of the waves impressed upon the wave guide 20. As a result the output wave of the section 21 is substantially circularly polarized.

Fig. 5 shows a switching system having four branches and also illustrates how three of these branches may be employed as in a switching system, particularly as a device which makes it possible to send and receive the same frequency simultaneously from the same antenna, as in a microwave relay system for communication purposes. The thickness of the element 1 and the potential of the source 8 are to be adjusted so as to give a 45° rotation of the plane of polarization. The output wave-guide section 6 is permanently turned with respect to the input section 5 preferably by an angle of 45° in the same direction as the rotation to be introduced by the element 1. A horizontal tunable probe 30 is employed on the input side of the element 1, this being oriented at right angles to the (vertical) direction of polarization of the wave-guide section 5. Another tunable probe 31 may be located on the output side of the device 1 and is preferably oriented at an angle of 45° from the vertical in a direction opposite to the direction of rotation in the element 1. The wave-guide section 6 is connected to an antenna or horn 32 through any suitable connection. The tunable probe 30 is connected in a suitable manner to a receiver 33, and the tunable probe 31 to any desired system or circuit 34. Highly conductive vanes 35 and 35' are preferably placed in the circular wave guide to reflect waves having their plane of polarization coincident with the plane of the vane. The spacing between each vane and the adjacent probe may be adjusted to give maximum power transfer to the respective circuits.

The operation of the system of Fig. 5 may be conveniently explained with reference to the diagram of Fig. 6. A vertically polarized wave as from a transmitter *a* connected to the wave guide 5 has neglible effect upon the probe 30 because the latter is at right angles to the direction of polarization in the wave guide 5. The vertically polarized wave is rotated 45° by the element 1 thereby bringing its plane of polarization at right angles to the direction of the probe 31 and into the preferrred direction for transmission through the wave guide 6 to the antenna 32. Substantially free transmission is therefore afforded from section 5 to antenna 32 and this condition is indicated in Fig. 6 by radial arrows labeled *a* and *b*, respectively, associated with a ring 36 and an arrow 37 diagrammatically indicating progression in the sense from *a* to *b*. Should a wave be received from space by the antenna 32, the polarization of the received wave in the section 6 is constrained to be in the direction indicated by *b* which is at right angles to the probe 31. This received wave is rotated 45° by the element 1 in the same direction with respect to the magnetic field as indicated by the arrow 38 in Fig. 5 thereby bringing the wave into a polarization agreeing with that of the probe 30 whereby the wave is conducted to the receiver 33. Should any of this wave proceed into the rectangular portion of the section 5 it will be discriminated against as not being in the preferred direction and may in addition be reflected by means of a conductive vane 35. This vane is inserted at such a position that the tunable probe 30 will be at an antinode in the voltage standing wave pattern. It will be evident that the wave of polarization as represented by *b* is conducted through the system to the receiver in the polarity indicated by *c*. This transmission is indicated by the arrow 37 in Fig. 6 which tends to turn the arrow *b* into the direction of the arrow *c*. A wave of the polarity represented by *c* impressed upon the probe 30 in any conceivable manner is not transmitted to the transmitter *a* and when rotated 45° by the element 1 is polarized in the proper direction for transmission by the probe 31 to the circuit 34 as indicated in Fig. 6 by the transition from *c* to *d*. In the above-cited example the circuit 34 and probe 31 are not used but these can be employed whenever desirable in other applications of the general system of Fig. 5.

A wave polarized in the direction of *d* impressed upon the probe 31 in any conceivable manner will be rotated 45° by the element 1 into the direction of polarization *a* but will be of opposite sign from that generated at the transmitter. This reversal of sign is indicated in Fig. 6 by the arrow labeled —*a*.

Fig. 7 is an alternative diagram representing the same information as that given in Fig. 6 but in a slightly different form. Here, the branches *a*, *b*, *c*, and *d* are represented at right angles to each other and may be regarded merely as the four circuits of Fig. 5, each considered without regard to its direction of polarization. The arrow 39 indicates the scheme of transmission when taken in conjunction with a minus sign 40. Transmission of waves impressed at *a* takes these waves to circuit *b*, transmission from *b* leads to circuit *c*, transmission from circuit *c* leads to circuit *d* and transmission from circuit *d* leads with a change of sign to circuit *a*. It is obvious to one familiar with the art that circuits *c* and *d* can be coupled to the wave guide by other means than the coaxial tunable probes illustrated.

Fig. 8 shows a one-way transmission system embodying the invention in a similar manner to the system of Fig. 5. The tuners 30 and 31, the receiver 33 and the circuit 34 are omitted and the wave-guide section 6 may be connected to any desired load. Also resistive vanes 46 and 47 are used in place of reflecting vanes 35 and 35'.

In the operation of the system of Fig. 8, a transmitter may be connected to the input wave-guide section 5 and the output wave guide section 6 may be connected to a transmission line, for example, the line being one which has some irregularity such as will reflect a portion of a wave sent into the line. The system of Fig. 8 operates to prevent or greatly reduce the reaction of the reflected wave upon the transmitter. To understand how this result is effected, consider a vertically polarized wave impressed upon the wave guide section 5 by the transmitter. This wave undergoes a 45° rotation of its plane of polarization in the clockwise sense as it traverses the element 1 from left to right and is enabled thus to pass freely through the wave guide section 6 to the line. A reflected portion of the wave thus introduced into the line, returning with the same direction of polarization undergoes a further rotation of its plane of polarization as it passes through the element 1 from right to left, thereby rendering its plane of polarization into space quadrature with the preferred plane of polarization of the wave guide section 5. Accordingly the reflected wave is rejected or greatly attenuated and its reaction upon the transmitted wave is greatly reduced compared with what it would be in the absence of means embodying the invention.

Fig. 9 shows a switching system having four branches and generally similar in resulting operation to that shown in Fig. 5 except that the phase reversal indicated by the minus sign 40 in the diagram of Fig. 7 is eliminated. In Fig. 9 the input guide 41 and the output guide 42 have their preferred directions at right angles to each other and the element 1 is arranged to give a rotation of 90°. The wave guides 41 and 42 lead respectively each to one arm of a wave guide junction or tee joint 43 and 44 respectively. These tee joints are of the type shown in Fig. 7 of U. S. Patent No. 2,445,895, issued July 27, 1948 to W. A. Tyrrell, a type of junction which is commonly referred to as a "magic tee" and also as a wave guide hybrid. Each of the tee junctions 43 and 44 leads to two branches, those in junction 43 being designated *a* and *c* and those in junction 44 being designated *b* and *d*. A reversing switch 45 is provided between the supply source 8 and the solenoid 7 for reversing the magnetization of the element 1 when desired. Resistive vanes 46, 47 are provided for absorbing wave components having undesired polarization directions. A resistive vane 48 which may be adjustable is inserted in the wave guide connection 49 between the junctions 43 and 44 to equalize the attenuation in the two circuit branches between the junctions 43 and 44. These branches comprise one branch through the element 1 and the other through the guide 49. A 90° permanent twist is introduced into the wave guide 41 at 50.

The operation of the device in Fig. 9 is conveniently explained by reference to Fig. 10. This figure is the same in plan as Fig. 6. A wave entering the junction 43 from the circuit *a* divides in two parts at the junctions, one part being transmitted through the element 1 and the other through the wave guide 49. The wave portion passing through the element 1 receives a 90° rotation which together with the twist in the wave guide at 50 brings this portion of the wave to the junction 44 with the same polarization, and the same time phase as the wave coming through the wave guide 49 of the two path lengths are adjusted so that this phase relation obtains. These two components annul each other in circuit $d$ but combine in circuit $b$ in like phase. Thus, as illustrated in Fig. 10 we have substantially free transmission from $a$ to $b$, the sense of progression being as indicated by the solid arrow 51. Waves entering the junction 44 from the circuit $b$ divide into two polarized components of like sign, one passing through wave guide 49 and the other through element 1 with a 90° rotation. The latter component after passing through the twisted section 50 arrives at the junction 43 in such phase relation to the other component as to be freely transmitted into the circuit $c$ and to be annulled in the circuit $a$. Similarly, transmissions originating in circuit $c$ pass freely into circuit $d$ and transmissions originating in circuit $d$ pass freely into circuit $a$ as indicated in Fig. 10. Should the reversing switch 45 be operated to reverse the magnetization of the element 1 the transmission characteristics of the system are reversed as indicated by the dotted arrow 52 in Fig. 10.

The element 1 when operated to produce a 90° rotation, as for example in the arrangement of Fig. 9 is a device of the type which has been called a "gyrator," by B. D. H. Tellegen in an article entitled, "The Gyrator, a New Electric Network Element," in Philips Research Reports, vol. 3, pages 81 through 101, published in 1948. Tellegen defines the ideal gyrator as a passive four-pole element which is described by $$v_1 = -Si_2 \quad (19)$$
$$v_2 = Si_1 \quad (20)$$

where $v_1$ and $v_2$ are the voltages respectively across the input and output pole pairs of the device, $i_1$ and $i_2$ are the corresponding currents through the input and output pole pairs respectively, and $S$ is a (complex) factor of proportionality. Since the coefficients of $i_2$ and of $i_1$ are of opposite sign in Equations 19 and 20, the gyrator violates the theorem of reciprocity. In simple terms this equality of coefficients but with opposite sign means that a 180° phase difference exists with respect to propagation of waves through the gyrator in the two directions. For this reason the gyrator may be termed an antireciprocal device and represents a special class of devices which may be termed non-reciprocal because they violate the theorem of reciprocity. The device of Fig. 9 may also be described as a directionally selective phase shifter. It produces a phase difference of 180° between transmissions in opposite directions, so that a wave passing twice through the element 1 in opposite directions is subjected to a 180° total phase shift, or what is the same thing, a phase reversal. In contrast to this device, a reciprocal phase shifter is one which, when traversed by a wave first in one direction and then in the opposite direction produces no net phase shift.

Fig. 11 shows an arrangement whereby the system of the invention may be used with massive pole pieces or a magnetic core structure such as shown at 55 which may be a permanent magnet or the core of an electromagnet. The wave guide containing the element 1 is inserted through holes 56, 57 in the structure 55 the axes of these holes being preferably parallel to the direction of the magnetic flux and may be connected between a transmitter and a load in any manner and with any relative orientation of the rectangular wave guide portions such as shown in illustrations of any of the other embodiments of the invention.

It will be evident that the transition members 2 and 3 may advantageously be made of ferrite of the same composition as the element 1, thereby tending further to reduce reflections, while the transition members themselves then also contribute to the amount of Faraday rotation produced. Also the transition members 2 and 3 and the element 1 may be combined into a single member.

The nickel-zinc ferrite element which was made as described hereinbefore in reference to Fig. 1 was of cylindrical form, having a length of 1.4 centimeters and a diameter substantially fitting the inside of a circular wave guide of inside diameter 0.9 inch. Fig. 12 shows the results of measurements made upon this element. The abscissae represent strength of the applied magnetic field in oersteds while the ordinates represent the resulting Faraday rotation expressed in degrees per centimeter thickness of the material traversed by the impressed waves. From the curve it can be ascertained that for a thickness of 1.4 centimeters of this material an angle of rotation of 45° is obtained by applying a magnetic field of approximately 320 oersteds and an angle of 90° is obtained by applying a magnetic field of approximately 1040 oersteds. Saturation was reached at approximately 1040 oersteds. Saturation was reached at approximately 96° by means of an applied field of approximately 1350 gauss.

In any of the embodiments of the invention illustrated, the element 1 may be replaced by a container of gas or liquid or by material in solid form other than ferrite, the choice of material being limited only by the presence of a proper resonance absorption frequency for the material not too far removed from the desired frequency of the incident waves. Among suitable materials are gases trapped in a clathrate molecular structure, as gas so trapped is equivalent to ordinary gas at enormous pressure and great density and is capable of producing large Faraday rotations in a wave guide of reasonable length. Since it has been demonstrated that the rotation is proportional to the magnetization and not to the applied magnetic field, it is also obvious that the solenoid can be dispensed with if a suitable ferromagnetic material is used which can be permanently magnetized.

It is to be understood that the above-described arrangements are illustrative of the application of the principles of the invention. Numerous other arrangements may be devised by those skilled in the art without departing from the spirit and scope of the invention.

What is claimed is:

A nonreciprocal electromagnetic wave transmission device comprising first and second sections of wave guide adapted to support wave energy in orthogonal polarizations, a polarization-selective wave guide connection for said first section adapted to couple to and from one of said polarizations in said first section, a polarization-selective wave guide connection for said second section adapted to couple to and from one of said polarizations in said second section that is related by an angle to said one polarization in said first section, an antireciprocal rotating element for rotating the plane of polarization of said energy by said angle interposed between and connecting said sections, a first vane of resistive material disposed in said first section in a plane that is normal to said one polarization therein to dissipate a major portion of the wave energy originating in said second section and rotated into the other of said polarizations in said first section on passing through said rotating element, the edges of said first vane inherently reflecting a minor portion of said last defined energy back toward said rotating element, and a second vane of resistive material disposed in said second section in a plane that is related to the plane of said first vane by said angle of rotation to dissipate said wave energy reflections from the edges of said first vane.

References Cited in the file of this patent

UNITED STATES PATENTS

| | | |
|---|---|---|
| 2,051,537 | Wolff et al. | Aug. 18, 1936 |
| 2,197,123 | King | Apr. 16, 1940 |
| 2,337,184 | Carter | Dec. 21, 1943 |
| 2,398,096 | Katzin | Apr. 9, 1946 |
| 2,402,948 | Carlson | June 2, 1946 |
| 2,425,345 | Ring | Aug. 12, 1947 |

(Other references on following page)

UNITED STATES PATENTS

| | | | |
|---|---|---|---|
| 2,452,529 | Snoek | Oct. 26, | 1948 |
| 2,458,579 | Feldman | Jan. 11, | 1949 |
| 2,461,005 | Southworth | Feb. 8, | 1949 |
| 2,477,510 | Chu | July 26, | 1949 |
| 2,514,679 | Southworth | July 11, | 1950 |
| 2,532,157 | Evans | Nov. 28, | 1950 |
| 2,644,930 | Luhrs | July 7, | 1953 |
| 2,650,350 | Heath | Aug. 25, | 1953 |

OTHER REFERENCES

Hewitt: "Microwave Resonance Absorption in Ferromagnetic Semiconductors," Physical Review, vol. 73, No. 9, May 1, 1948.

Article, Miller, "Magnetically controlled wave-guide Attenuators," Journal of Applied Physics, vol. 20, issue No. 9, pages 878 to 883, September 1949.